US008596225B2

(12) United States Patent
Hughes

(10) Patent No.: US 8,596,225 B2
(45) Date of Patent: Dec. 3, 2013

(54) ANTI-STACKING PUMP ASSEMBLY FOR A WATER HEATER AND METHOD OF OPERATING THE SAME

(75) Inventor: Dennis R. Hughes, Hartford, WI (US)

(73) Assignee: AOS Holding Company, Wilmington, DE (US)

( * ) Notice: Subject to any disclaimer, the term of this patent is extended or adjusted under 35 U.S.C. 154(b) by 1208 days.

(21) Appl. No.: 12/275,048

(22) Filed: Nov. 20, 2008

(65) Prior Publication Data

US 2010/0122669 A1     May 20, 2010

(51) Int. Cl.
*F22B 37/50* (2006.01)
(52) U.S. Cl.
USPC .......................................... 122/14.3; 122/429
(58) Field of Classification Search
USPC ...................... 122/14.3, 14.31, 13.3, 429, 430
See application file for complete search history.

(56) References Cited

U.S. PATENT DOCUMENTS

| | | | | |
|---|---|---|---|---|
| 1,119,405 | A | * | 12/1914 | Crerar ......................... 366/169.1 |
| 4,197,446 | A | * | 4/1980 | Kalmanoviz ................. 392/461 |
| 4,216,091 | A | * | 8/1980 | Mineau .......................... 210/175 |
| 4,670,397 | A | | 6/1987 | Wegner et al. |
| 4,703,748 | A | | 11/1987 | Laing et al. |
| 4,777,347 | A | | 10/1988 | Mottershead |
| 4,790,289 | A | * | 12/1988 | Barrett ......................... 122/17.1 |
| 4,790,291 | A | | 12/1988 | Barrett |
| 4,959,526 | A | | 9/1990 | Kurachi et al. |
| 4,964,333 | A | | 10/1990 | Bravo |
| 5,168,546 | A | * | 12/1992 | Laperriere et al. ............ 392/454 |
| 5,596,952 | A | * | 1/1997 | Lannes et al. ................. 122/14.1 |
| 6,553,947 | B2 | * | 4/2003 | Bradenbaugh ............... 122/14.3 |
| 6,736,535 | B2 | | 5/2004 | Halsall et al. |
| 7,100,541 | B2 | * | 9/2006 | Frasure et al. ................ 122/159 |
| 7,331,704 | B2 | | 2/2008 | Howk et al. |
| 7,634,976 | B2 | * | 12/2009 | Gordon et al. ............... 122/14.3 |
| 2002/0066419 | A1 | * | 6/2002 | Bradenbaugh ............... 122/14.3 |
| 2004/0139930 | A1 | * | 7/2004 | Frasure et al. ............. 122/367.4 |
| 2005/0120473 | A1 | | 6/2005 | Southon et al. |
| 2010/0096018 | A1 | * | 4/2010 | Wylie et al. ....................... 137/2 |

FOREIGN PATENT DOCUMENTS

JP        11050997 A  *  2/1999

OTHER PUBLICATIONS

A.O. Smith Water Heaters Commercial Water Heater Parts List, Cyclone XHE—Model BTH—300A/400A, Series 974/975. Available at http://www.hotwater.com/lit/partslist/197177-001.pdf, at least as early as Nov. 20, 2008.
Finish Thomson Inc. TM Series Drum Mixer. Available at http://www.finishthompson.com/assets/downloads/dp-flyers/flyer_dp_tm.pdf, at least as early as Nov. 20, 2008.

* cited by examiner

*Primary Examiner* — Gregory A Wilson

(57) ABSTRACT

A storage-type water heater. The storage-type water heater comprising a water storage tank configured to retain tank water, means for heating the tank water in the water storage tank, and an anti-stacking pump assembly. The anti-stacking pump assembly includes a water tube configured to be positioned in the water storage tank, an impeller positioned within the water tube, a motor drivingly connected to the impeller, a water inlet formed in the water tube upstream of the impeller and configured to deliver tank water into the water tube from the water storage tank, and a water outlet formed in the water tube downstream of the impeller.

16 Claims, 5 Drawing Sheets

ANTI-STACKING PUMP ASSEMBLY FOR A WATER HEATER AND METHOD OF OPERATING THE SAME

BACKGROUND

The present invention relates to water heaters, and more particularly to an anti-stacking pump assembly for a water heater.

Stacking in a storage-type water heater is a result of unevenly heated water in the tank. Stacking can occur as a result of the design and location of the heat exchanger, as well as the thermal input of the water heater. Stacking can also occur in water heaters having many consecutive small draws of water, thereby causing the heating element to frequently cycle on and off.

SUMMARY

In one embodiment, the invention provides a storage-type water heater comprising a water storage tank configured to retain tank water, means for heating the tank water in the water storage tank, and an anti-stacking pump assembly. The anti-stacking pump assembly includes a water tube configured to be positioned in the water storage tank, an impeller positioned within the water tube, a motor drivingly connected to the impeller, a water inlet formed in the water tube upstream of the impeller and configured to deliver tank water into the water tube from the water storage tank, and a water outlet formed in the water tube downstream of the impeller.

In another embodiment, the invention provides an anti-stacking pump assembly for use in a water heater having a water storage tank configured to retain tank water, means for heating the tank water in the water storage tank, and a fitting. The anti-stacking pump assembly includes a water tube configured to be positioned in the water storage tank, an impeller positioned within the water tube, a motor positioned on an end of the water tube and drivingly connected to the impeller, a water inlet formed in the water tube upstream of the impeller and configured to deliver tank water from the water storage tank into the water tube, and a water outlet formed in the water tube downstream of the impeller. The fitting is configured to receive the anti-stacking pump assembly to couple the anti-stacking pump assembly to the water storage tank.

In another embodiment, the invention provides a method of preventing stacking in a water heater having a water storage tank configured to retain tank water, means for heating the tank water in the water storage tank, and a pipe fitting. The method includes the steps of providing an anti-stacking pump assembly in the water heater, the anti-stacking pump assembly including a water tube having a water inlet and a water outlet, an impeller, and a motor in the water heater, positioning the water tube in the water storage tank, positioning the impeller in the water tube downstream of the water inlet, operating the impeller with the motor on an end of the water tube to pull water from the water storage tank into the water tube through the inlet, pushing the water along a length of the water tube by operation of the impeller, mixing the water from the water tube exiting the outlet of the water tube with tank water in the water storage tank to control temperature of the tank water in the water storage tank, and mounting the anti-stacking pump assembly in the fitting to couple the anti-stacking pump assembly to the water storage tank.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
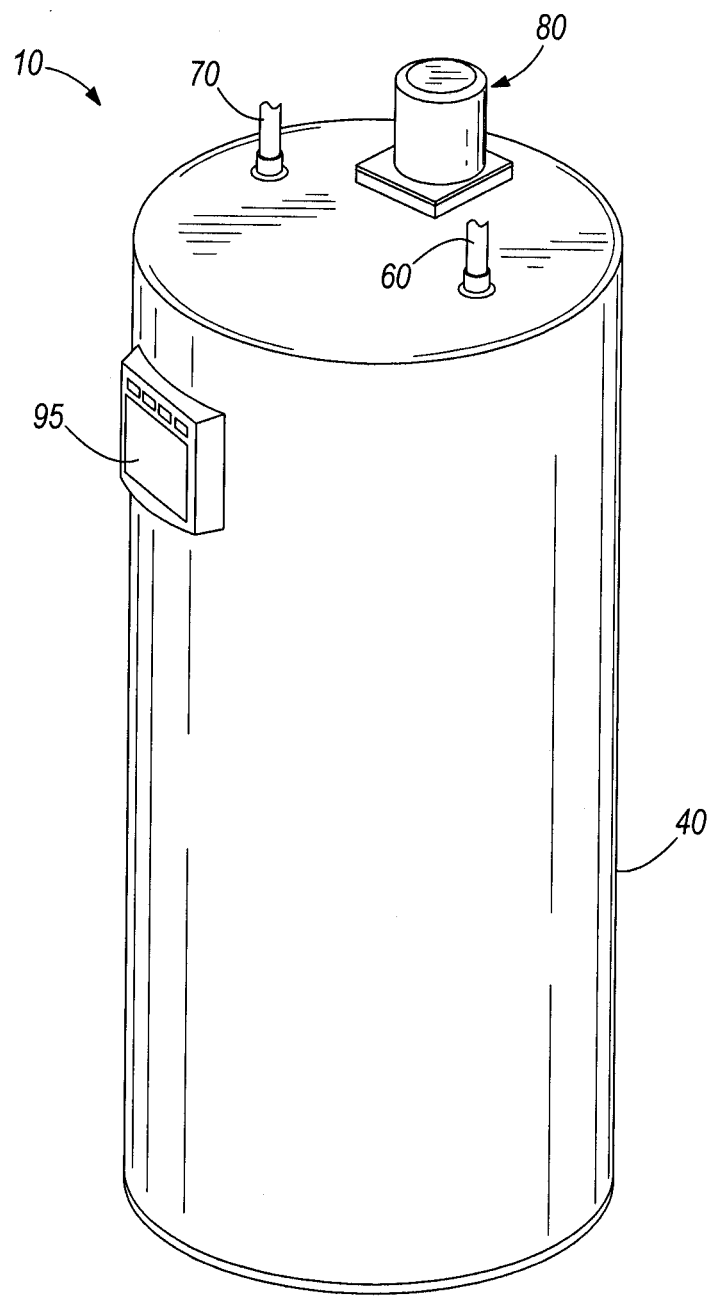
FIG. 1 is a perspective view of a water heater embodying some aspects of the invention.
Figure 2:
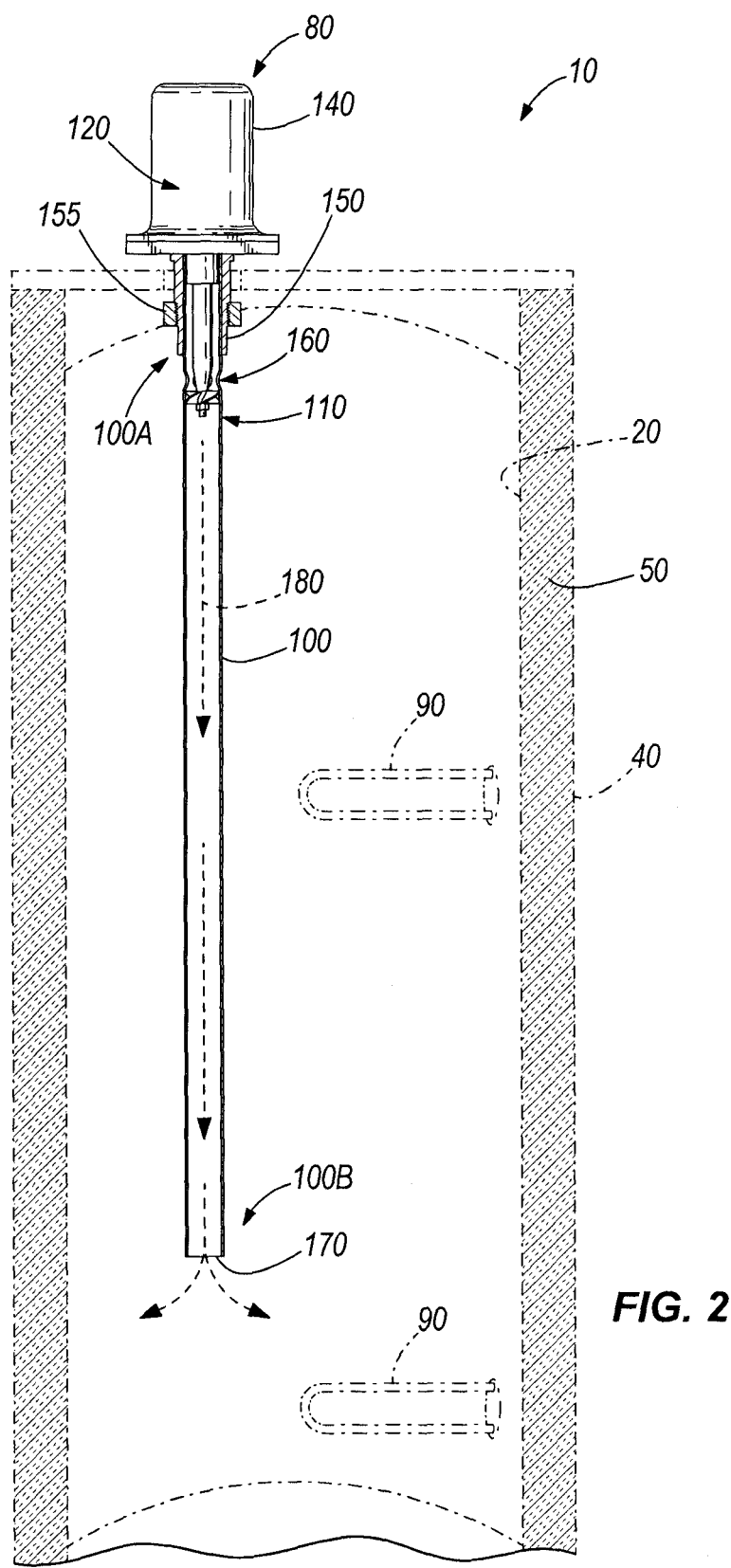
FIG. 2 is a cut-away view of a portion of the water heater of FIG. 1 showing an anti-stacking pump assembly according to one embodiment of the invention.

FIG. 1 illustrates a storage-type water heater 10 embodying the invention. As shown in FIGS. 1 and 2, the water heater 10 comprises a water storage tank 20 to contain water to be heated, an outer jacket 40 surrounding the water storage tank 20, insulation 50 between the tank 20 and the jacket 40, and an anti-stacking pump assembly 80. The water heater also includes means for heating the water in the water storage tank. In the illustrated construction, the heating means include electric heating elements 90 extending into the tank 20. In other constructions, the water heater can be heated by a gas burner, as is known in the art. Other types of heating means can be employed. The water heater can also include a control system 95, which may include temperature or other sensors and an operator panel. It is to be understood that the water heater 10 described herein is only for exemplary purposes. Other constructions of the water heater also fall within the scope of the invention.

Figure 3:
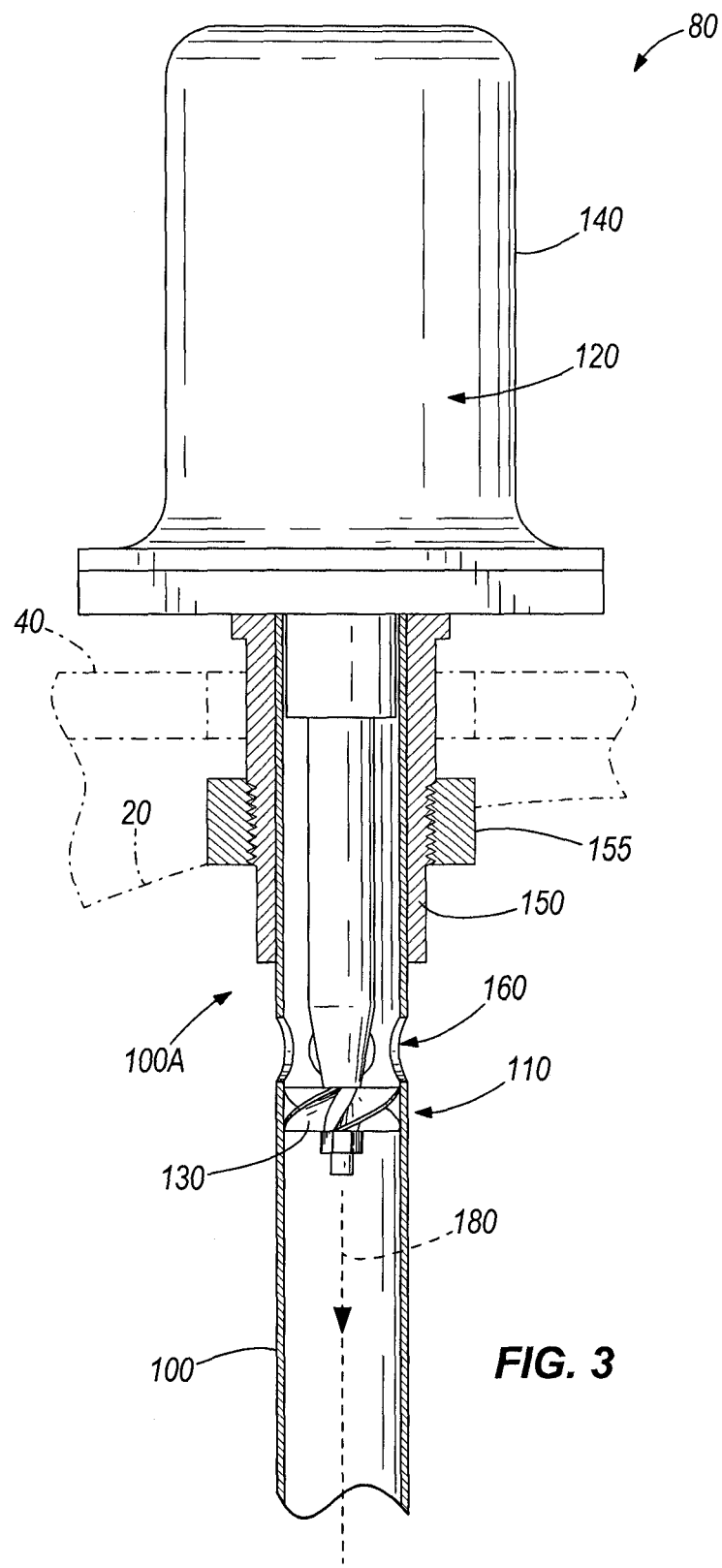
FIG. 3 is a detailed view of the anti-stacking pump assembly of FIG. 2.

As shown in FIGS. 2-3, the anti-stacking pump assembly 80 includes a water tube 100, an impeller 110, and a motor 120. The water tube 100 extends through the outer jacket 40 into the water storage tank 20. The water tube 100 includes a first or upper end 100A communicating with the motor 120 and a second or lower end 100B opposite the first end 100A. The impeller 110 includes a plurality of blades 130 configured for rotation to move water downward or downstream of the impeller 110 through the water tube 100. The impeller is shown as having four blades; however, in other embodiments, the impeller may have other numbers of blades. The impeller 110 and the blades can have various configurations. The motor 120 includes a motor housing 140 and is positioned at the upper end 100A of the water tube and is drivingly connected to the impeller 110. The anti-stacking pump assembly 80 further includes a sleeve 150 to seal the connection between the motor housing 140 and the water tube 100. The sleeve 150 further includes threads for mounting the anti-stacking pump assembly 80 to the tank 20. As shown, a spud or fitting 155 extends from the tank 20 and includes threads to receive and mate with the threads on the sleeve 150. Accordingly, the anti-stacking pump assembly 80 may be retro-fitted to an existing water heater.

The anti-stacking pump assembly 80 further includes a water inlet 160 formed in the water tube 100 and positioned upstream or above the impeller 100. The water inlet 160 is further positioned in the water tube 100 below the level of water in the water storage tank 20. The water inlet is shown as a plurality of apertures integrally formed in the water tube. However, in other embodiments, the water inlet may comprise a single aperture and be any shape. The size of the water inlet may be adjusted depending on the water heater application. The water inlet 160 is configured to permit water to enter the tube 100 as water is drawn into the tube 100 by the impeller 110. The anti-stacking pump assembly 80 further includes a water outlet 170 formed in the lower end 100B of the tube 100 downstream of the impeller 110.

As the tank water is heated by operation of the heating element 90, the anti-stacking pump assembly 80 is activated to promote mixing of hot water and cold water within the water storage tank 20. The motor 120 operates the impeller 110 to move water along the length of the water tube 100 in a downstream direction 180. The force of the water moving downstream in the water tube 100 causes tank water to be drawn into the water tube 100 through the water inlet 160. The tank water entering the water tube 100 through the water inlet 160 is subsequently pushed along the length of the water tube 100 by operation of the impeller 110. The water entering the water inlet is generally hot water. At the water outlet 170, the water from the water tube 100 mixes with the water near the bottom of the tank 20, where the water temperature is usually lower. The mixing of water reduces stacking within the water storage tank 20 and improves the amount of evenly heated water that can be withdrawn from the tank 20.

In operation, the anti-stacking pump assembly 80 is active while the heating elements 90 are operational. In some embodiments, the anti-stacking pump assembly may include an off-delay configured to operate the anti-stacking pump assembly for a specific time period after the heating element is turned off. In still other embodiments, the operation of the pump assembly may be linked to the control system 95 and be based on a variety of factors, including but not limited to, a predetermined time period, a predetermined temperature, or other factors.

In other embodiments not shown, the impeller 110 may be configured for rotation to move water upward of the impeller 110. In such embodiments, the positions of the water inlet and outlet as illustrated are reversed, such that the water inlet is positioned at the lower end of the tube and the water outlet is positioned at the upper end of the tube. Accordingly, the impeller 110 moves water along the length of the water tube 100 in an upward direction. At the water outlet, the water from the water tube 100 mixes with the water near the top of the tank 20.

Figure 4:
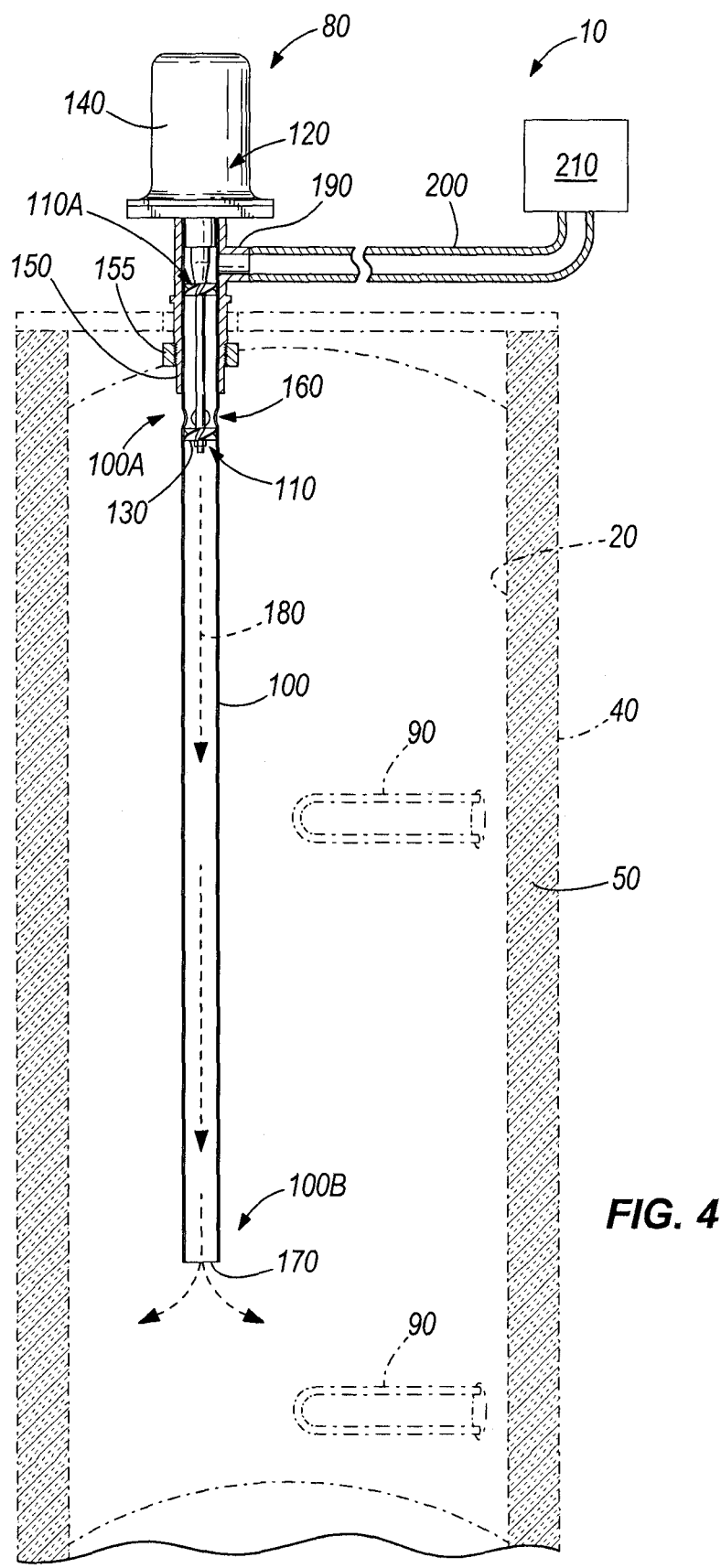
FIG. 4 is a cut-away view of a water heater with an anti-stacking pump assembly according to another embodiment of the invention.

In other embodiments, and as shown in FIG. 4, the water heater 10 may include a water recirculation connection 190. The water recirculation connection 190 is shown as a hot water recirculation connection that returns a hot water line 200 from a fixture 210 to the water heater 10. In such embodiments, the anti-stacking pump assembly 80 may include a second impeller 110A. The second impeller 110A is positioned in the water tube 100 upstream of the water inlet 160 and downstream of the water recirculation connection 190. The second impeller 110A is configured for rotation to move water downward or downstream of impeller 110A. In still other embodiments utilizing a water recirculation connection 190, the anti-stacking pump assembly 80 may only include the first impeller 110.

Figure 5:
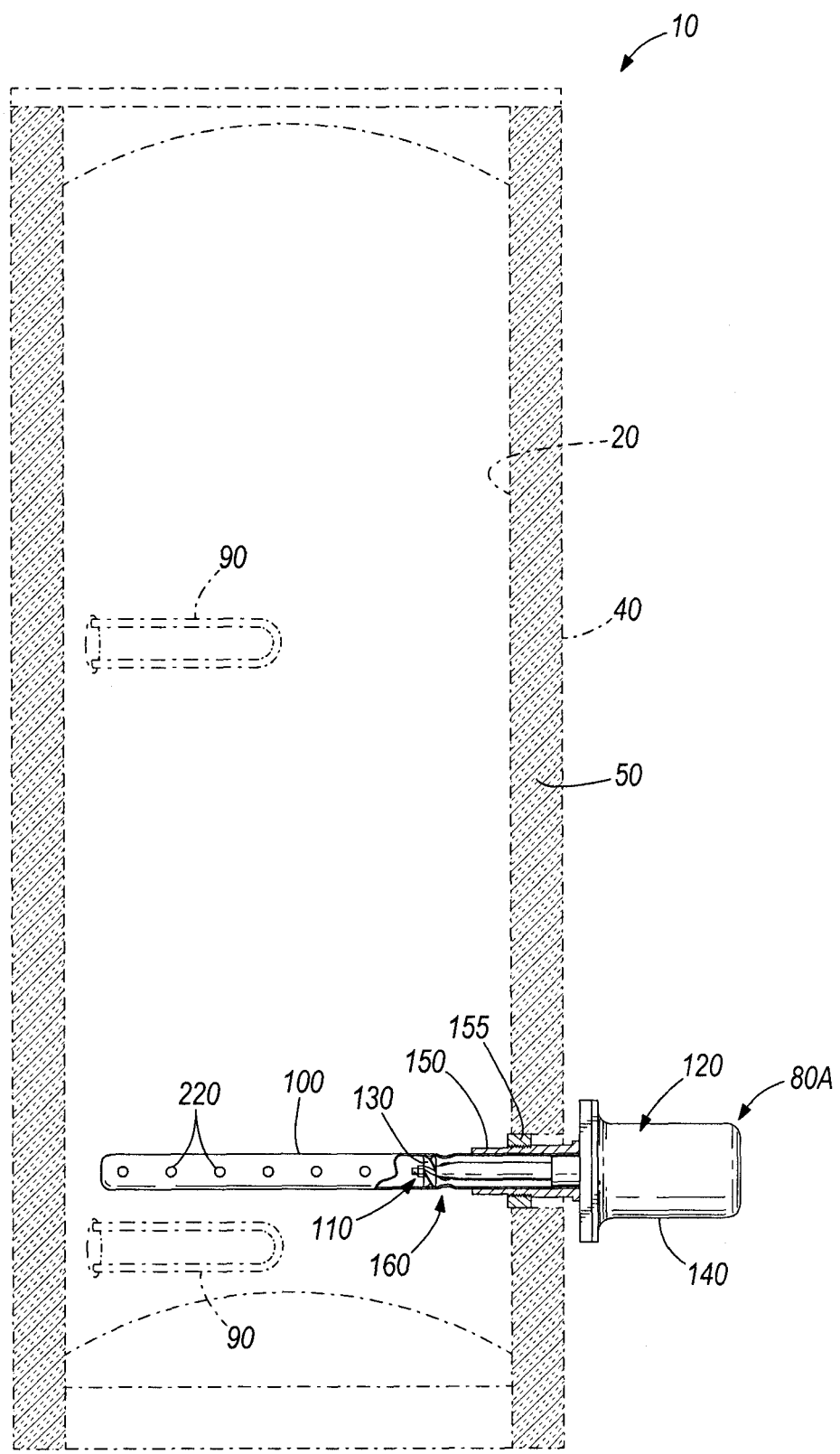
FIG. 5 is a cut-away view of a water heater with an anti-stacking pump assembly according to another embodiment of the invention.

FIG. 5 illustrates yet another alternative anti-stacking pump assembly 80A according to the invention. The anti-stacking pump assembly 80A shown in FIG. 5 includes similar structure to the anti-stacking pump assembly 80 and components illustrated in FIGS. 2-4 and described above; therefore, like structure is identified by the same reference numerals. As shown in FIG. 5, the anti-stacking pump assembly 80A is positioned horizontally near the bottom of the water storage tank 20 to prevent settling of sediment. Tube 100 includes the water outlet in the form of a plurality of apertures 220 formed along the length of the tube 100. The plurality of apertures 220 are configured to permit water to flow from the water tube 100 into the water storage tank 20 along the length of the tube 100 to promote water agitation. The apertures are shown as a uniform size and circular shape; however, in other embodiments, the apertures may be of varying size and shape. Also, the anti-stacking pump assembly may be positioned at a higher height in the water storage tank than the height shown in FIG. 5.

In other embodiments not shown, the anti-stacking pump assembly 80 may be positioned at other locations in the tank, including, but not limited to extending vertically within the tank from the bottom of the tank. In such embodiments, the impeller may be configured for rotation to move water upward from the impeller 110, such that the water inlet is positioned at the lower end of the tube, and the water outlet is positioned at the upper end of the tube. In yet another embodiment having the anti-stacking pump assembly extending vertically within the tank from the bottom of the tank, the impeller may be configured for rotation to move water downward from the impeller such that the water inlet is positioned at the upper end of the tube and the water outlet is positioned at the lower end of the tube.

Other embodiments of the present invention may utilize combinations of the above embodiments. It is to be appreciated by one having ordinary skill in the art that in any of the embodiments described above, the direction of impeller rotation may be changed, which accordingly reverses the location of the water inlet and water outlet. The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Various features and advantages of the invention are set forth in the following claims.

What is claimed is:
1. A storage-type water heater comprising:
a water storage tank configured to retain tank water;
means for heating the tank water in the water storage tank;
an anti-stacking pump assembly comprising:
a water tube extending vertically and into the water storage tank, the tube having an upper end outside the tank and a lower end inside the tank;
an impeller positioned within the water tube;
a motor drivingly connected to the impeller, the motor being supported on the upper end of the tube;

a water inlet formed in the water tube above and upstream of the impeller and inside the tank to deliver tank water into the water tube; and a water outlet formed in the water tube inside the tank and below and downstream of the impeller.

2. The storage-type water heater of claim 1, further comprising a fitting receiving the anti-stacking pump assembly to couple the anti-stacking pump assembly to the water storage tank.

3. The storage-type water heater of claim 1 wherein the water inlet includes a plurality of apertures.

4. The storage-type water heater of claim 1, further comprising a water recirculation connection coupled to the anti-stacking pump assembly upstream of the water inlet and configured to feed water to the water tube.

5. The storage-type water heater of claim 4, further comprising a second impeller positioned in the water tube upstream of the water inlet and downstream of the water recirculation connection.

6. The storage-type water heater of claim 2, wherein the pump assembly also includes a sleeve surrounding an upper portion of the tube, the sleeve having external threads mating with internal threads in the fitting.

7. The storage-type water heater of claim 6, wherein the sleeve seals a connection between the motor and the tube.

8. An anti-stacking pump assembly for use in a water heater having a water storage tank configured to retain tank water, means for heating the tank water in the water storage tank, and a fitting, the anti-stacking pump assembly comprising:

a water tube configured to extend vertically into the water storage tank, the tube having an upper end configured to be outside the tank and a lower end configured to be inside the tank;

an impeller positioned within the water tube;

a motor positioned on the upper end of the water tube and drivingly connected to the impeller;

a water inlet formed in the water tube above and upstream of the impeller and configured to deliver tank water from the water storage tank into the water tube; and a water outlet formed in the water tube below and downstream of the impeller;

wherein the fitting is configured to receive the anti-stacking pump assembly to couple the anti-stacking pump assembly to the water storage tank.

9. The anti-stacking pump assembly of claim 8 wherein the water inlet includes a plurality of apertures.

10. The anti-stacking pump assembly of claim 8, further comprising a water recirculation connection positioned upstream of the water inlet configured to feed water to the water tube and a second impeller positioned in the water tube upstream of the water inlet and downstream of the water recirculation connection.

11. The assembly of claim 8, wherein the assembly also comprises a sleeve surrounding an upper portion of the tube, the sleeve having external threads configured to mate with internal threads in the fitting.

12. The assembly of claim 11, wherein the sleeve seals a connection between the motor and the tube.

13. A method of preventing stacking in a water heater having a water storage tank configured to retain tank water, means for heating the tank water in the water storage tank, and a fitting, the method comprising the steps of:

providing an anti-stacking pump assembly in the water heater, the anti-stacking pump assembly including a water tube having a water inlet and a water outlet, an impeller, and a motor in the water heater;

positioning the water tube so that the tube extends vertically into the water storage tank, the tube having an upper end outside the tank and a lower end inside the tank, and the water inlet being above the water outlet;

positioning the impeller in the water tube downstream of and below the water inlet and upstream of and above the water outlet;

operating the impeller with the motor on the upper end of the water tube to pull water from the water storage tank into the water tube through the inlet;

pushing the water downward along a length of the water tube by operation of the impeller;

mixing the water from the water tube exiting the outlet of the water tube with tank water in the water storage tank to control temperature of the tank water in the water storage tank; and mounting the anti-stacking pump assembly in the fitting to couple the anti-stacking pump assembly to the water storage tank.

14. The method of claim 13, further comprising connecting a water recirculation connection to the water tube upstream of the water inlet and positioning a second impeller in the water tube upstream of the water inlet and downstream of the water recirculation connection.

15. The method of claim 13, wherein the pump assembly also includes a sleeve surrounding an upper portion of the tube, the sleeve having external threads, and wherein the method comprises inserting the sleeve into the fitting so that the threads on the sleeve mate with internal threads in the fitting.

16. The method of claim 15, wherein the sleeve seals a connection between the motor and the tube.

* * * * *